UNITED STATES PATENT OFFICE 2,446,167

2,3-DICYANO-3-BUTEN-2-YL ESTERS

Erhard J. Prill, Cresskill, N. J., assignor to United States Rubber Company, a corporation of New Jersey No Drawing. Application August 19, 1947, Serial No. 769,535

6 Claims. (Cl. 260—465.4)

This invention relates to new chemical compounds, namely 2,3-dicyano-3-buten-2-yl esters of monocarboxylic acids containing from one to seven carbon atoms, and to a method of preparing these new compounds.

The new chemical compounds of the present invention have the following structural formula

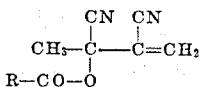

where R is selected from the group consisting of hydrogen, alkyl groups having from one to six carbon atoms and phenyl.

The new compounds of the present invention are useful both as chemical intermediates and as monomers for addition-type polymerizations, e.g., for polymerization with other monomeric unsaturated compounds, such as styrene.

I have discovered that the new chemical compounds of my invention can be prepared by the thermal decomposition of the lower monocarboxylic acid diesters of 2,3-butanedione bis-cyanohydrin, having the structural formula

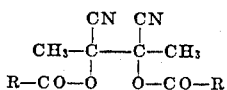

where R is selected from the group consisting of hydrogen, alkyl groups having from one to six carbon atoms and phenyl.

The two R's in the structural formula just given are generally identical. Where R is hydrogen the ester is one of formic acid. Esters of any other aliphatic monocarboxylic acid having from one to seven carbon atoms may be employed. Thus R can be any lower alkyl group having from one to six carbon atoms. Examples where R is an alkyl group are methyl, ethyl, n-propyl, isopropyl, n-butyl, isobutyl, secondary butyl, tertiary butyl, any of the amyl radicals including n-amyl, active amyl, isoamyl, secondary amyl, neopentyl, secondary isoamyl, tertiary amyl, any of the hexyl radicals including n-hexyl, isohexyl, etc. Where R is a phenyl group, the ester is one of benzoic acid.

The thermal decomposition of the diesters involves pyrolytic cracking with liberation of one molecule of the monocarboxylic acid in accordance with the following equation:

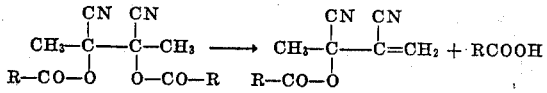

The pyrolytic cracking is carried out at temperatures of from 400° to 500° C. The vapors of the diester are conducted, preferably continuously, through a hot reaction zone, e.g. a reaction tube, maintained at a temperature between 400° and 500° C. effective to remove the elements of the molecule of the carboxylic acid and at a rate which will minimize polymerization and other deleterious chemical reactions of the product. The duration of the reaction, i.e. the contact time, is preferably at least 0.2 second but less than 5 seconds. I have found that employment of a reaction time as indicated gives markedly high yields of my new compounds.

The reaction is usually carried out by introducing the starting material, preferably in the form of a solution in an unreactive solvent, e. g. acetic acid or acetone, to facilitate introduction of the material, into a hot reaction zone at 400°–500° C., passing the vaporized materials continuously through said zone, and condensing the effluent gases. The pyrolysis can be conducted at reduced pressures or in the presence of an inert diluent, e. g. nitrogen, or both at reduced pressure and in the presence of such a diluent, if desired. The liquid reaction products are treated in any manner known to those skilled in the art to isolate and recover the 2,3-dicyano-3-buten-2-yl ester therefrom. The liquid reaction products can be readily isolated and purified by fractional distillation or by any other suitable procedure.

The following example discloses my invention in more detail. All parts are by weight.

Example

A hot (100° C.) solution of 140 parts of 2,3-butanedione bis-cyanohydrin diacetate in 420 parts of acetic acid is gradually admitted to a pyrolysis tube comprising a 40" length of 30 mm. Pyrex glass tubing packed with 3–8 mesh quartz chips and maintained at 440°–450° C. The solution is introduced into the reaction tube at such a rate as to provide a contact time of approximately 4.60 seconds based on the volume of free space in the tube. The hot effluent gases are condensed in a receiver which is cooled by dry ice and contains 0.1 part of hydroquinone as a polymerization inhibitor.

The receiver is warmed to room temperature and the solid unreacted starting material is removed by filtration. The filtrate is evaporated at 55 mm. pressure to remove most of the acetic acid, and the residual liquid, after filtration, is fractionally distilled to yield first a small amount of α,β-dimethylenesuccinonitrile (b. ca. 80 C./8 mm.) and then 33.7 parts of 2,3-dicyano-3-buten- 2-yl acetate, a colorless liquid, b. 88–9° C./1 mm.; $n_D^{20}$, 1.4737; sp.g.$_{20}^{20}$, 1.0983.

|  | Per cent C | Per cent H | Per cent N | Molar Refraction |
|---|---|---|---|---|
| Analysis: |  |  |  |  |
| Found | 58.41 | 4.87 | 17.37 | 40.15 |
| Theory | 58.50 | 4.87 | 17.07 | 41.85 |

Equal weights of 2,3-dicyano-3-buten-2-yl acetate and styrene are mixed and heated at 60° C. in the presence of 1.0% by weight of benzoyl peroxide to yield a solid copolymer containing approximately 16.0% by weight of 2,3-dicyano-3-buten-2-yl acetate.

Having thus described my invention, what I claim and desire to protect by Letters Patent is:

1. As a new chemical compound, a 2,3-dicyano-3-buten-2-yl ester of a monocarboxylic acid having the structural formula

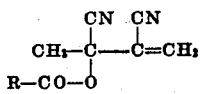

where R is selected from the group consisting of hydrogen, alky groups having from one to six carbon atoms and phenyl.

2. As a new chemical compound, 2,3-dicyano-3-buten-2-yl acetate having the structural formula

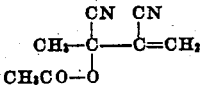

3. A method of preparing a 2,3-dicyano-3-buten-2-yl ester of a monocarboxylic acid having the structural formula

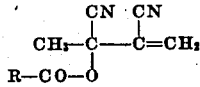

where R is selected from the group consisting of hydrogen, alkyl groups having from one to six carbon atoms and phenyl which comprises heating the corresponding lower monocarboxylic acid diester of 2,3-butanedione bis-cyanohydrin having the structural formula

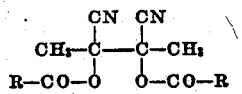

where R is selected from the group consisting of hydrogen, alkyl groups having from one to six carbon atoms and phenyl for a time of at least 0.2 second but less than 5 seconds in a reaction zone maintained at a temperature of from 400° to 500° C., removing the products from the reaction zone, and recovering 2,3-dicyano-3-buten-2-yl ester therefrom.

4. A method of preparing 2,3-dicyano-3-buten-2-yl acetate having the structural formula

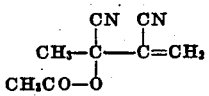

which comprises continuously passing the vapor of 2,3-butanedione bis-cyanohydrin diacetate having the structural formula

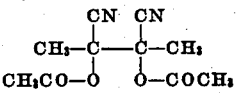

through a reaction zone maintained at a temperature of from 400° to 500° C., removing the products from the reaction zone, and recovering 2,3-dicyano-3-buten-2-yl acetate therefrom.

5. The method of claim 4 wherein said diacetate is held in said zone for a time of at least 0.2 second but less than 5 seconds.

6. The method of claim 4 wherein said temperature is 440°–450° C. and wherein the reaction time is approximately 4.6 seconds.

ERHARD J. PRILL.